Oct. 20, 1953 R. TERLECKI 2,656,415
TUNING INDICATOR FOR FREQUENCY SHIFT TELEGRAPH SYSTEMS
Filed Aug. 13, 1951
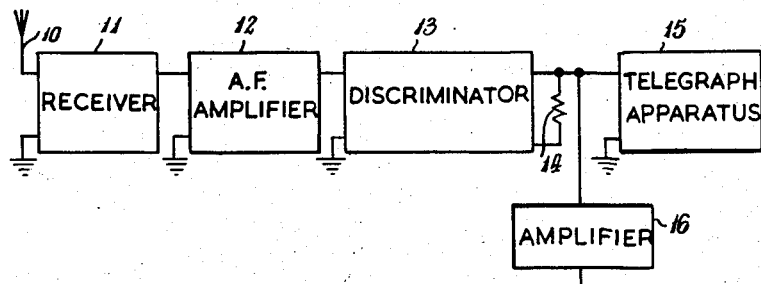
Fig. 1.
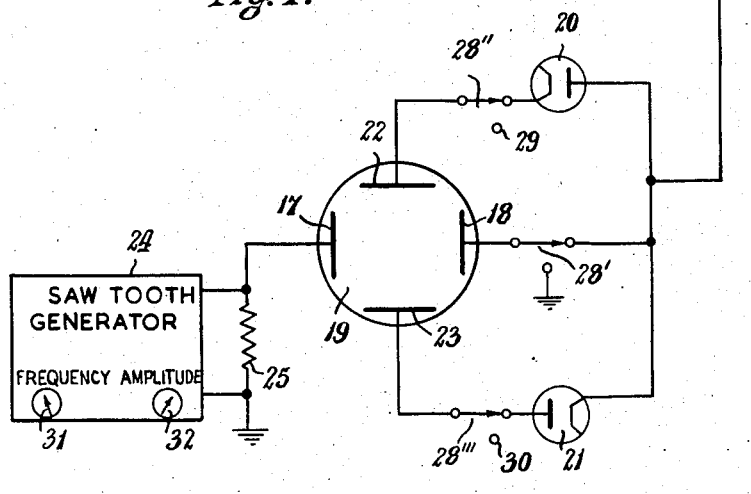
Fig. 2. Fig. 3.
Inventor
Renat Terlecki
By Ralph B. Stewart
attorney Patented Oct. 20, 1953

2,656,415

UNITED STATES PATENT OFFICE 2,656,415

TUNING INDICATOR FOR FREQUENCY
SHIFT TELEGRAPH SYSTEMS

Renat Terlecki, Taplow, England, assignor to
British Telecommunications Research Limited,
Taplow, England, a British company Application August 13, 1951, Serial No. 241,531
In Great Britain September 21, 1950

5 Claims. (Cl. 178—69)

1

The present invention relates to tuning indicators for frequency shift telegraph systems.

In such systems there is provided at a receiver terminal a frequency discriminator whose output is positive or negative with respect to a mean value corresponding to the centre frequency according to whether a mark or a space signal is being received.

Frequency stability is an important requirement in such systems, whether the transmission is by radio or land line, since any frequency drift occurring in the transmission, or mistuning at the receiver, results in a displacement of the above-mentioned mean value. This produces biased telegraph signals and if severe enough may result in failure of the system.

Methods are known of eliminating the D. C. component from the output of the discriminator, and in this way telegraph signals with little bias are produced even with comparatively large frequency drifts, but they are not desirable mainly because of the great loss of signal to noise ratio especially at high noise levels.

The best-known forms of tuning indicator employ a centre-zero moving coil meter which owing to the inertia of its moving parts or to the characteristics of its circuit has a tendency to indicate the average value of the discriminator output. With high speed Morse signalling there can readily be transmitted test signals in the form of reversals, that is to say signals of alternate mark and space of equal durations and the centre-zero meter then provides an adequate indication.

However, automatic typing machines as a rule use a special code which cannot provide pure reversals and with these a centre-zero meter is found to give a fluctuating indication.

Moreover it is undesirable to make provision for frequent transmission of a test signal, mainly because of the resulting reduction of overall telegraph speed and the possibility of confusion in procedure by operators.

Certain relatively expensive forms of tuning indicator employ either a cathode ray tube or a moving coil meter and are designed to make an accurate measurement of the mark frequency. These indicators have the advantage of those previously referred to that they give an approximate indication of tuning accuracy even during normal traffic. They have the disadvantage, however, that they rely upon the maintenance of a great accuracy in the relation between the mark and space frequencies and fail when a slight error occurs in the amount of frequency

2 shift employed. Moreover they give no indication of a balanced output from the discriminator.

The present invention has for its object to provide an improved tuning indicator for use in frequency shift telegraph systems, whereby the disadvantages above mentioned can be overcome or substantially reduced.

According to the present invention a tuning indicator suitable for use in frequency shift telegraph systems comprises a cathode ray tube indicator, means for applying voltage from an input terminal to one pair of deflecting plates of the indicator, and further means for applying the said voltage through oppositely directed rectifiers to the plates of the other pair respectively. Thus the deflections of the cathode ray produced by input voltages of opposite sign from the discriminator of a frequency shift telegraph receiver are at 90° to one another and hence give a display in the form of a V. The V may of course be inverted or on its side depending upon the manner in which the connections are made to the deflecting plates. Irrespective of the attitude of the V-shaped display, the relative lengths of the arms of the V are a measure of the degree of unbalance in the output of the discriminator. If the positive and negative-going outputs of the discriminator are of equal amplitudes the arms of the V are of equal lengths. Any unbalance in the output of the discriminator is shown in the display as a lengthening of one of the arms of the V and shortening of the other.

In a preferred arrangement the indicator also comprises an oscillation generator and means for applying oscillations generated thereby to the said one pair of deflecting plates, the oscillation generator being adapted to generate oscillations of a frequency high relatively to that of normal telegraph signals whereby each arm of the V-shaped display is widened and assessment of the degree of unbalance in the output of the discriminator is facilitated. The frequency of the oscillation generator may be, for example, 500 c/s.

The invention will now be described by way of example with reference to the accompanying drawing, in which:

Figure 1 is a schematic diagram of one embodiment of the invention, and

Figures 2 and 3 are explanatory diagrams.

In Figure 1 frequency shift telegraph signals are received at an aerial 10 and are passed by way of a receiver 11 to an audio frequency (or intermediate frequency) amplifier 12. The output of the amplifier 12 is applied to discriminator 13 whose output appears across a resistor 14. The discriminator may be of any suitable kind such as, for example, that described on page 586 of "Radio Engineers Handbook" by F. E. Terman, published by the McGraw-Hill Book Company, New York, 1943.

The voltages developed across the resistor 14 are applied to telegraph apparatus 15 and to an amplifier 16. The output of the amplifier 16 is applied to one pair of deflecting plates 17 and 18 of a cathode ray tube 19 and through oppositely directed rectifiers 20 and 21 to the other pair of deflecting plates 22 and 23.

The rectifier 20 has its cathode connected to the plate 22 and hence positive-going voltages are transmitted to the plate 22. The rectifier 21 has its anode connected to the plate 23 and hence negative-going voltages are transmitted to the plate 23. Thus when the output of the amplifier 16 is negative-going the beam in the cathode ray tube 19 is deflected from the centre of the tube to a position between the two plates 17 and 22, and when the output of the amplifier 16 is positive-going the beam is deflected to a position between the two plates 18 and 22. It will be seen that the deflection component along the axis of plates 22—23 is in the same direction for both positive and negative pulses applied to these plates, but the deflection component along the axis of plates 17—18 is effected in opposite directions for positive and negative pulses applied to these plates. The appearance of a succession of alternately negative- and positive-going voltages at the output of the amplifier 16 causes therefore a V-shaped pattern to be traced on the screen of the cathode ray tube. With a square wave form as generally used in telegraphy the upper ends of the V will be bright owing to the relatively long time during which the beam dwells on these points and the remainder of the trace will be relatively faint. Unbalanced signals are indicated by the arms of the V being of different lengths.

In order to facilitate assessment of asymmetry in the signals a sweep oscillation is also applied between the plates 17 and 18. The application of the sweep voltage causes the tops of the V to be drawn out into lines and similarly to broaden the whole V. In Figure 1 the sweep oscillation is provided by a generator 24 whose output is in the form of oscillations of sawtooth wave form of a frequency much higher than the frequency of the received telegraph signals. The output of the generator 24 is developed across a resistor 25 connected between the plate 27 and earth and hence does not produce vertical deflection of the beam.

A display in the form of a symmetrical V indicating a balanced output from the amplifier 16 is shown at 26 in Figure 2. A display in the form of a V having arms of unequal length indicating an unbalanced output from the amplifier 16 is shown at 27 in Figure 3. It will be appreciated that the screen of the cathode ray tube may be provided with a calibrated scale in order to enable a direct reading of frequency shift to be obtained, the frequency shift being proportional to the length of the arms of the V.

Switches 28', 28" and 28''' are provided for earthing the plate 18 of Figure 1 and connecting the plates 22 and 23 to terminals 29 and 30 respectively in order to enable the cathode ray tube to be used for normal oscillograph presentation.

The switches 28', 28" and 28''' may be ganged, and if desired the switch 28' may be dispensed with by providing an earth at the input terminal when normal oscillograph presentation is required. The sweep oscillation is then used as time base, the frequency and amplitude of the sawtooth oscillation being suitably adjusted by controls 31 and 32. Normal oscillograph presentation is provided without the need for rotating the tube through 90°.

The arrangement according to the invention has the following advantages over known arrangements.

(a) It can be arranged to provide advance warning of any serious frequency drift, so that the receiver tuning may be adjusted before incorrect operation of the printer can occur.

(b) The tuning of the receiver can be effected whilst traffic is in progress without the need for a special test signal.

(c) It will operate with a relatively low signal to noise ratio.

(d) The indication is not affected by changes in the amount of frequency shift employed: with a change in the frequency shift only the total height of the V pattern is altered and not the relative heights of the two arms.

(e) The same cathode ray tube can be used to give oscillographic presentation to permit the maintenance of the equipment and for monitoring the output of receivers used in diversity, the observation of the signal condition, the efficiency of the aerials and the optimum tuning for maximum signal to noise ratio.

I claim:

1. A tuning indicator for use in frequency shift telegraph systems for indicating the tuning of a receiver in the system relatively to the mark and space frequencies employed in the system, the tuning indicator comprising a cathode ray tube having two pairs of beam deflecting plates, two input terminals, means to connect the said input terminals to the two plates respectively in one of said pairs, rectifier means connected between one of the input terminals and one of the plates in the other of said pairs, and further rectifier means connected between the said one of the input terminals and the other of the plates in the other of said pairs and being oppositely poled with respect to said first mentioned rectifier means.

2. A tuning indicator as claimed in claim 1, and comprising a generator of sawtooth oscillations, and means to apply the sawtooth oscillations generated by said generator between the plates of the said one pair of plates.

3. A tuning indicator as claimed in claim 1, and comprising a generator of oscillations of sawtooth waveform, means to apply the sawtooth oscillations generated by said generator between the plates of the said one pair of plates, and switch means to connect and disconnect said rectifier means from the plates of said other pair.

4. A tuning indicator as claimed in claim 1, wherein the means for connecting the input terminals to the two plates respectively in the said one of the pairs comprises switch means to connect one of said input terminals directly to one plate of said one of said pairs of plates.

5. In a frequency shift telegraph system, the combination of a receiver for a frequency-shift carrier wave including a frequency discriminator producing positive and negative pulses representing mark and space signals, said pulses having amplitudes dependent upon the amount of deviation of the frequency of said carrier wave from the tuning of said receiver, a cathode ray tube having two deflection systems arranged with their deflection axis at right angles to each other, connections for applying the output pulses from said discriminator to one of said deflection systems to deflect the cathode ray beam along one deflection axis and in opposite directions for the positive and negative pulses, and connections including rectifying means for energizing the other deflection system by said pulses for deflection of said beam along the other deflection axis and in the same direction for both positive and negative pulses.

RENAT TERLECKI.

References Cited in the file of this patent

UNITED STATES PATENTS

| Number | Name | Date |
|---|---|---|
| 2,278,641 | Bond | Apr. 7, 1942 |
| 2,432,944 | Shillington | Dec. 16, 1947 |
| 2,448,363 | Firestone et al. | Aug. 31, 1948 |
| 2,613,271 | Trevor | Oct. 7, 1952 |